(12) United States Patent
Kline et al.

(10) Patent No.: US 7,565,648 B2
(45) Date of Patent: Jul. 21, 2009

(54) SYNTACTIC TO SEMANTIC BINDING

(75) Inventors: David C. Kline, Bothell, WA (US); Michael G. Boilen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1097 days.

(21) Appl. No.: 10/922,586

(22) Filed: Aug. 19, 2004

(65) Prior Publication Data

US 2006/0041423 A1 Feb. 23, 2006

(51) Int. Cl.
*G06F 9/45* (2006.01)
(52) U.S. Cl. .................................... 717/143
(58) Field of Classification Search ............. 717/143
See application file for complete search history.

(56) References Cited

U.S. PATENT DOCUMENTS

| | | | |
|---|---|---|---|
| 4,931,928 A * | 6/1990 | Greenfeld | 717/131 |
| 5,099,425 A * | 3/1992 | Kanno et al. | 704/9 |
| 5,490,249 A * | 2/1996 | Miller | 714/38 |
| 5,652,835 A * | 7/1997 | Miller | 714/38 |
| 5,751,941 A | 5/1998 | Hinds et al. | |
| 5,754,860 A * | 5/1998 | McKeeman et al. | 717/124 |
| 6,249,882 B1 | 6/2001 | Testardi | |
| 6,353,897 B1 | 3/2002 | Nock et al. | |
| 6,601,018 B1 | 7/2003 | Logan | |
| 6,735,719 B2 | 5/2004 | Moe et al. | |
| 7,028,222 B2 * | 4/2006 | Peterson et al. | 714/38 |

OTHER PUBLICATIONS

Fouillouze, et al.; "Criteria for the organisation and management of program testing: experiences and possible generalisation"; pp. 59-70; AICA '79 Conference; Oct. 1979.
Belli, et al.; "A Test Coverage Notion for Logic Programming"; Proceedings International Symposium on Software Reliability Engineering; 1995; pp. 133-142.
Harder, et al.; "Improving Test Suites via Operational Abstraction"; Proceedings 25th International Conference on Software Engineering; May 2003; pp. 60-71.
von Mayrhauser, et al.; "Testing Applications Using Domain Based Testing and Sleuth"; 1994 IEEE International Symposium on Software Reliability Engineering; pp. 206-215.

* cited by examiner

*Primary Examiner*—John Chavis
(74) *Attorney, Agent, or Firm*—Lee & Hayes, PLLC

(57) ABSTRACT

In order to facilitate automated operations with software, semantic meaning of data values is bound to the syntactic type of the data values. In a described implementation, a piece of software accepts inputs and produces outputs. The inputs have a specified syntactic type (e.g., runtime type) and an expected semantic meaning. The semantic meaning corresponds to a real-world description of relevant data for the input. Providing a data set that matches the specified syntactic type and the expected semantic meaning as input to the software enables a relevant operation with the software to be performed. An example automated operation is the testing of a piece of software. In another described implementation, a synmantic data object is created and/or utilized that includes a syntactic type attribute and a semantic meaning attribute for the contained data value(s). Other optional attributes include locale indication and a validity flag.

36 Claims, 7 Drawing Sheets

SYNTACTIC TO SEMANTIC BINDING

TECHNICAL FIELD

This disclosure relates in general to binding semantic meaning to syntactic type of data values and in particular, by way of example but not limitation, to utilizing data of an appropriate syntactic type in accordance with its associated semantic meaning when performing an operation, such as a test, on a piece of software.

BACKGROUND

Software impacts nearly every facet of modern society, from communications and entertainment to business productivity and governmental efficiency. To accommodate all of these demands, new software is continually written, and it is written at an ever increasing rate. To ensure software provides its intended functionality, each new piece of software is tested.

To be useful, software usually accepts input of some kind and produces an output in response. As software has become more complex and interdependent, it has become difficult if not impossible to verify software merely by reviewing the lines of code. Hence, testing software entails providing a range of inputs and ensuring that the correct or expected output is produced.

The inputs can be provided manually, by code, by test script, and so forth. Regardless, the data for the inputs is created on an ad hoc basis for each piece of software to be tested. In other words, the tester has to create meaningful data for the different relevant inputs. The data also (hopefully) covers all possible problem points with the inputs and the associated manipulations thereof by the software code. This is an extraordinarily tedious and human-resource-intensive proposition that is repeated for virtually all of the new software code that is created.

Accordingly, there is a need for schemes and/or techniques that can address the above-described and other deficiencies in an efficient and/or uniform manner to e.g. facilitate the testing of software.

SUMMARY

In order to facilitate automated operations with software, semantic meaning of data values is bound to the syntactic type of the data values. In a described implementation, a piece of software accepts inputs and produces outputs. The inputs have a specified syntactic type (e.g., runtime type) and an expected semantic meaning. The semantic meaning corresponds to a real-world description of relevant data for the input. Providing a data set that matches the specified syntactic type and the expected semantic meaning as input to the software enables a relevant operation with the software to be performed. An example automated operation is the testing of a piece of software. In another described implementation, a synmantic data object is created and/or utilized that includes a syntactic type attribute and a semantic meaning attribute for the contained data value(s). Other optional attributes include locale indication and a validity flag. In yet another described implementation, relevant operational data can be acquired from a data provider having a data store that is organized to bind semantic meaning to syntactic type of the data stored therein.

Other method, system, approach, apparatus, device, media, procedure, application programming interface (API), arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

A mechanism for binding semantic meaning to the syntactic type of data is described. In a described implementation, this binding takes the form of a data store (e.g., an XML file or files, an SQL database, etc.) containing the data, the data's runtime type, a validity flag, and a user-defined semantic type. Applications can request data from the data store through a client API or class and are able to request valid and/or invalid data cases. The data store can be updated manually or by using a suite of automated tools.

In a testing environment example, by binding semantic meaning to the syntactic type of test data, test applications can be rapidly created without needing to supply specialized test data at the time of development. Furthermore, test case data can be varied and enhanced without changing the test code. Generally, this binding enables test tools to provide better coverage while facilitating the maintenance thereof.

EXAMPLES OF SYNTACTIC TO SEMANTIC BINDING AND RELATED SYNMANTIC DATA OBJECTS

Figure 1:
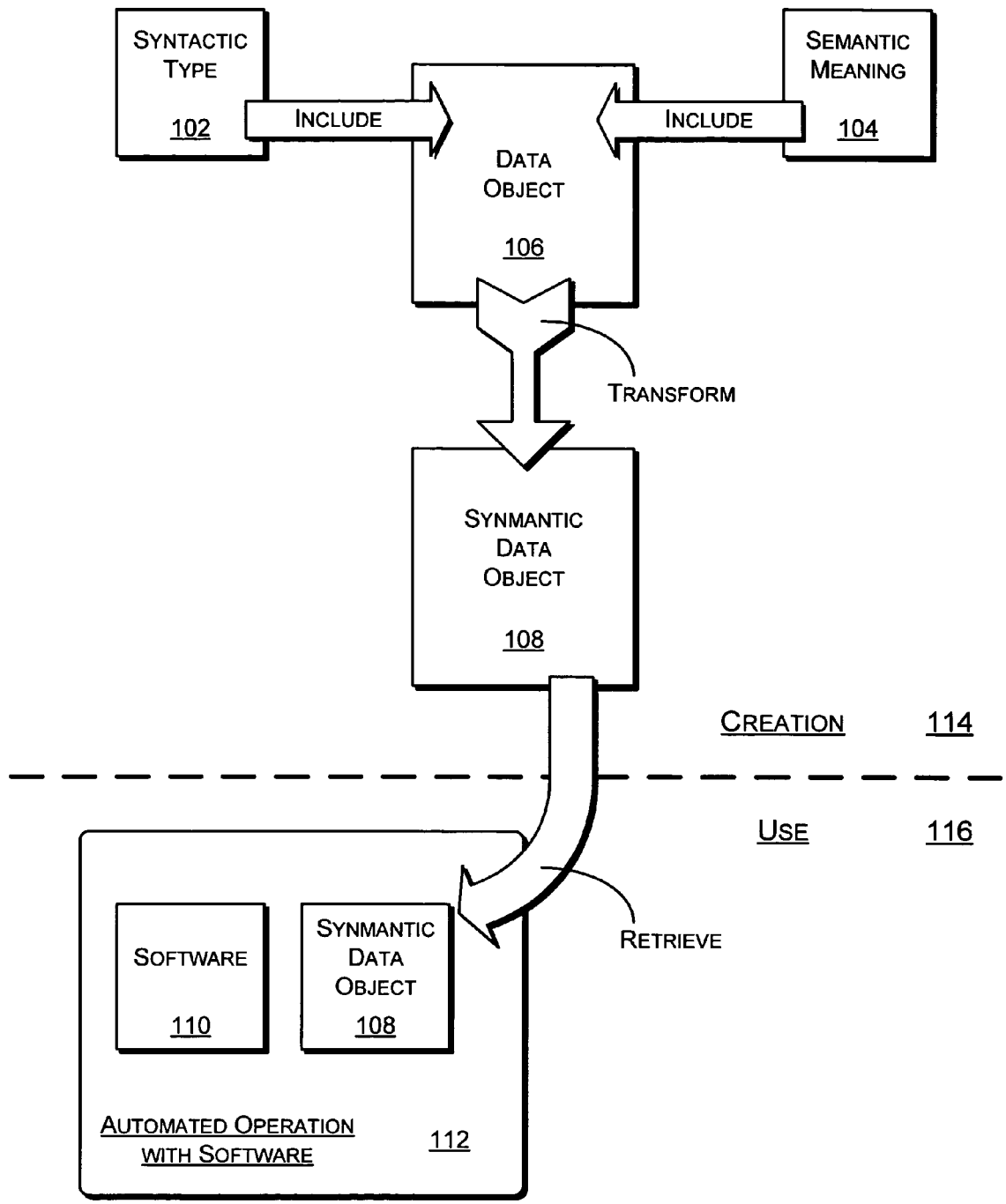
FIG. 1 is an example of the creation and use of a synmantic data object.

FIG. 1 is an example of the creation 114 and use 116 of a synmantic data object 108. With the creation 114 of synmantic data object 108, a data object 106 having some value (or values) is present. A syntactic type 102 and a semantic meaning 104 for the value of data object 106 are included as part of data object 106. With the inclusion of syntactic type 102 and semantic meaning 104, data object 106 is transformed into a synmantic data object 108.

Syntactic type 102 is the runtime type of the data. Semantic meaning 104 represents what the data describes. By way of example, syntactic type 102 may be integer, string, floating point, and so forth. Moreover, syntactic type may be something more complex such as a type object. Generally, the syntactic type is stored, but a runtime may specify the type information in any manner, such as a type object, an integer code, and so forth. On the other hand, semantic meaning 104 may be city, zip code, species, sport, state, movie, and so forth.

With the use 116 of synmantic data object 108, synmantic data object 108 is retrieved for use in an automated operation 112 with software 110. In other words, some operation is performed using both software 110 and synmantic data object 108. By way of example, the data value(s) of synmantic data object 108 may be applied to software 110 in order to test and evaluate software 110 with relevant data that is both syntactically correct and semantically meaningful.

Figure 2:
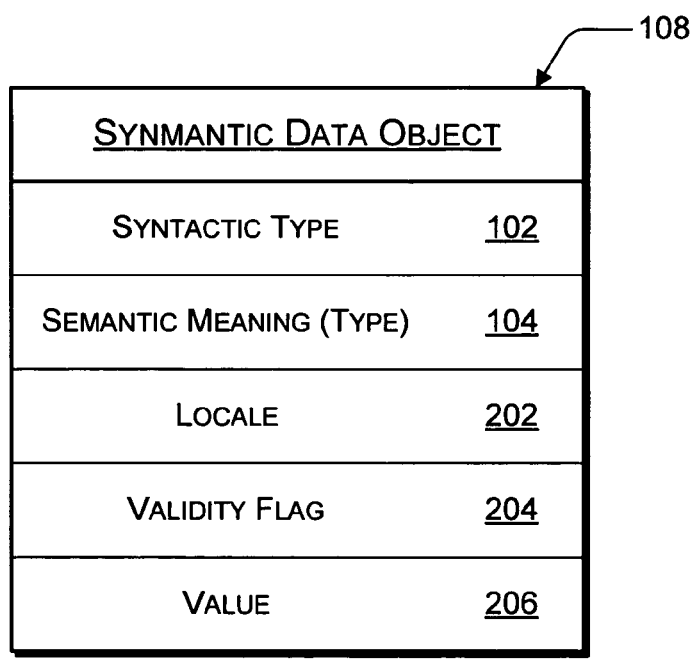
FIG. 2 is an example of a synmantic data object.

FIG. 2 is an example of a synmantic data object 108. As illustrated, synmantic data object 108 includes syntactic type 102, semantic meaning (type) 104, locale 202, validity flag 204, and value 206. In a described implementation, locale 202 and validity flag 204 are optional attributes for a synmantic data object 108.

With semantic binding technology, semantic meaning 104 is bound to value 206. As described above, syntactic type 102 specifies the runtime environment type (e.g., 32-bit integer) of synmantic data object 108. Semantic meaning or type 104 specifies the real-world type (e.g., "street address") of synmantic data object 108. When a developer writes a new function, he/she typically names the function arguments in a manner such that their intended meaning is clear to the caller (e.g., "streetAddress"). In certain implementations as described further herein below, this descriptive naming can be extracted to automatically provide the semantic meaning of the argument.

Locale 202 and validity flag 204 are optional attributes of synmantic data object 108. Locale 202 provides regional and/or cultural pertinence to a semantically bound data object, such as synmantic data object 108. Data objects that are valid in one locale may not be valid in any other region. For example, for the semantic "province", a value of "British Columbia" is valid if the locale specifies "Canada". This same "British Columbia" value is not valid if the specified locale is "Mexico".

Given a particular semantic meaning 104 and locale 202, synmantic data objects 108 contain either a valid or an invalid value 206. Validity flag 204 indicates this validity or invalidity. Synmantic data objects 108 containing valid values 206 are considered semantically meaningful within the specified locale. Synmantic data objects 108 containing invalid values 206 are typically incorrectly formatted, or they may contain data that is not semantically meaningful for the given locale.

Values 206 that are culturally agnostic may have the field of locale 202 set to the empty string (" ") to indicate being in a "neutral" locale or when locale 202 is otherwise not pertinent. With regard to equivalency, if the fields of two synmantic data object 108 are equal, then they may be considered to be equivalent.

An example data structure for a semantically bound data object is provided below:

```
namespace SemanticBinding
{
    public class SemanticData
    {
        public Type SyntacticType;
        public String SemanticType;
        public String Locale;
        public Boolean IsValid;
        public Object Value;
    }
}
```

Figure 3:
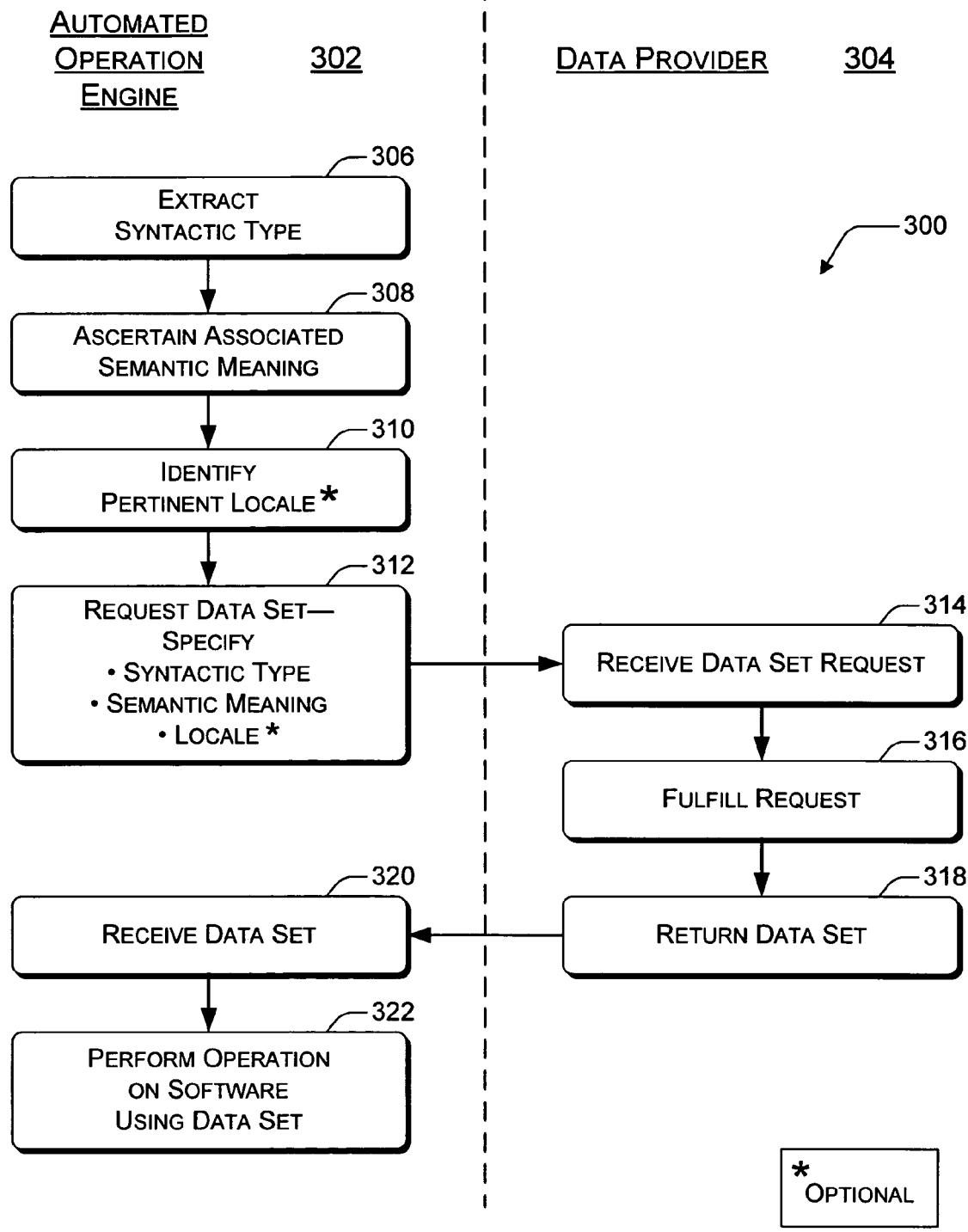
FIG. 3 is a flow diagram that illustrates an example of a method for using syntactic to semantic binding to acquire relevant data.

FIG. 3 is a flow diagram 300 that illustrates an example of a method for using syntactic to semantic binding to acquire relevant data. Flow diagram 300 includes nine (9) blocks 306-322. Although the actions of flow diagram 300 may be performed in other environments, with a variety of hardware and software combinations, and with different synmantic data object implementations, FIGS. 1 and 2 are used in particular to illustrate certain aspects and examples of the method.

An automated operation engine 302 performs the actions of blocks 306-312 and 320-322. Automated operation engine 302 takes a piece of software 110, acquires relevant data using synmantic data object(s) 108, and performs some operation with software 110 using the data values of synmantic data object 108. By way of example, automated operation engine 302 may perform one or more tests on software 110. The relevant data is acquired from data provider 304. Data provider 304 performs the actions of blocks 314-318.

At block 306, a syntactic type is extracted. For example, automated operation engine 302 may extract a syntactic type of a value to be input to software 110. At block 308, an associated semantic meaning is ascertained. For example, automated operation engine 302 may infer the semantic meaning of the input value from a name given the value or method thereof in software 110.

At block 310, a relevant locale is identified. The locale can be specified by software 110, a user or creator of software 110, a person overseeing execution of automated operation engine 302, a user or creator thereof, and so forth. For implementations in which locale is substantially irrelevant and/or for locale-agnostic software (110), the actions of block 310 may be omitted.

At block 312, a data set is requested that specifies the extracted syntactic type, the ascertained semantic meaning, and optionally the locale. For example, automated operation engine 302 may use an API to specify the syntactic type, the semantic meaning, and the relevant locale for data being requested from data provider 304.

At block 314, the data provider receives the data request. At block 316, the request is fulfilled. For example, data provider 304 may access a data store thereof to retrieve a data set meeting the parameters as specified in the request. Hence, data provider 304 may produce one or more synmantic data objects 108 that match the requested syntactic type, semantic meaning, and relevant locale at the syntactic type 102, semantic meaning 104, and locale 202, respectively, of the one or more synmantic data objects 108. At block 318, a data set containing the one or more synmantic data objects 108 is returned from the data provider. For example, data provider 304 may provide the requested data set to automated operation engine 302 using an appropriate API.

At block 320, the requesting automated operation engine receives the data set. At block 322, an operation on the software is performed using the received data set. For example, automated operation engine 302 may test software 110 by applying value(s) 206 of the one or more synmantic data objects 108 to input(s) of software 110 in order to precipitate output(s). These output(s) may then be evaluated and analyzed by automated operation engine 302 and/or a creator of software 110.

EXAMPLES OF SYNTACTIC TO SEMANTIC BINDING IN EXEMPLARY TESTING ENVIRONMENT IMPLEMENTATIONS

Three example testing usage scenarios are described below: unit testing, functionality (API) testing, and stress testing. The semantic binding technology described herein enables data centric, automated testing in each of these three scenarios.

Firstly, unit testing is the most basic form of testing applied when developing a new class library or method. Unit tests typically involve a small collection of data that exercises the basic functionality of the method (e.g., convert 32 degrees Fahrenheit to 0 degrees Celsius). Negative, boundary, and corner case testing is typically not performed as part of a unit test pass.

Secondly, functionality, or API, testing is the next step above unit testing. API test cases tend to be more exhaustive than unit test cases. Functionality testing is typically broken into correctness and negative testing. However, functionality testing can include at least four categories: basic functionality, boundary conditions, corner cases, and negative test cases.

There are therefore four described categories of functionality testing. First, basic functionality tests the behavior of an API using common, valid data. Second, boundary conditions tests use data near the boundaries of given data types. Boundary conditions testing typically includes some negative testing. Third, corner cases involve tests that incorporate data triggering scenarios which normal testing methods generally do not cover. Fourth, negative testing uses data that causes an API's failure path to be revealed and covered.

Thirdly, stress testing is designed to provoke failures in an API when it is run under stressful conditions, such as long duration runs, low memory and/or resource constrained situations, very large data sets, and so forth.

In a described implementation, semantic binding technology is utilized in a target runtime environment having the following features: (1) hierarchical type system: so as to be able to return data collections of any possible type (e.g., intrinsic and custom), the runtime environment offers a type system which derives from a common base object; (2) ability to determine argument type at run time: to enable a common testing engine, argument types are determinable at run time by calling code; (3) ability to determine argument name at run time: to be able to determine the semantic of an argument, the argument name is discoverable at run time; and (4) support for library registration: data provider discovery uses a method (e.g., a unified registry, a configuration file, etc.) to register the provider library. It should be understood that these features are examples for the implementation described in this section.

For a data store of the data provider, any format can be used as long as the data enumerated above (e.g., syntactic type, semantic meaning, data value, etc.) are may be stored using the format. Example options for storage are an XML format, an SQL or other database format, and so forth. In order to support remote data providers, support for standard networking technologies (e.g., TCP/IP, sockets, etc.) are included.

Figure 4:
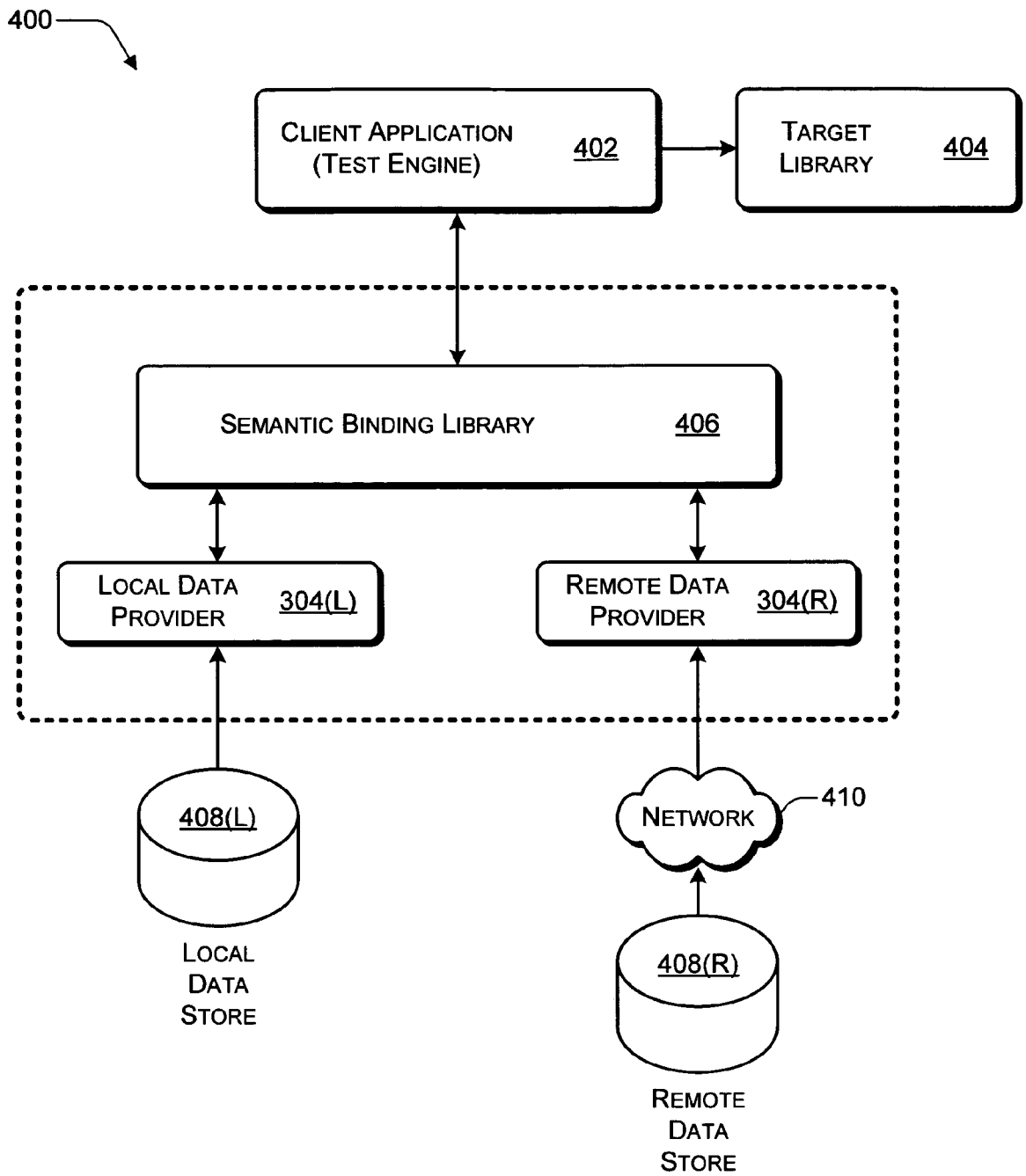
FIG. 4 is an example of a functional design architecture for semantic binding technology in an exemplary testing environment implementation.
Figure 5:
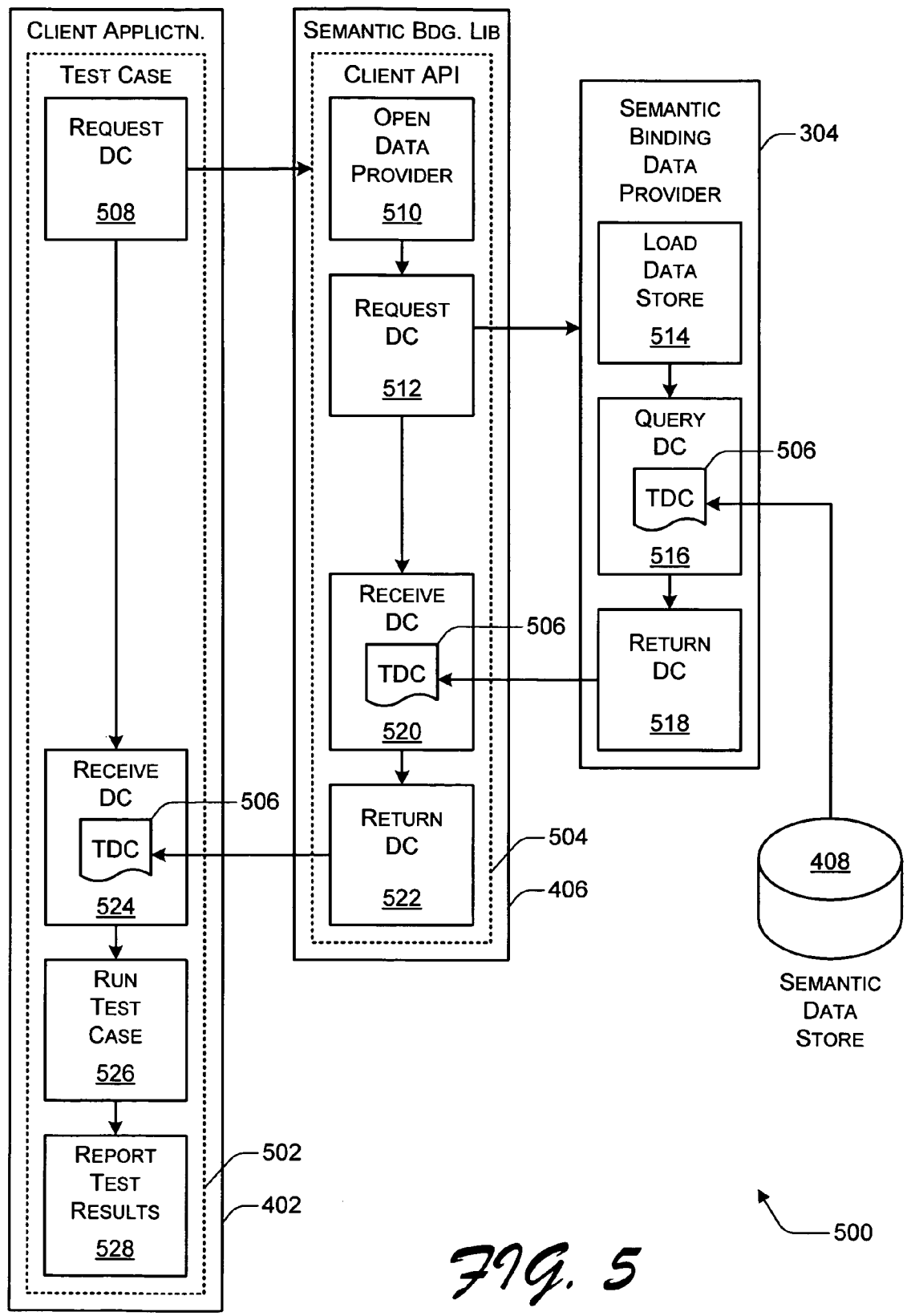
FIG. 5 is an example of a general flow of data for semantic binding technology in the exemplary testing environment implementation.
Figure 6:
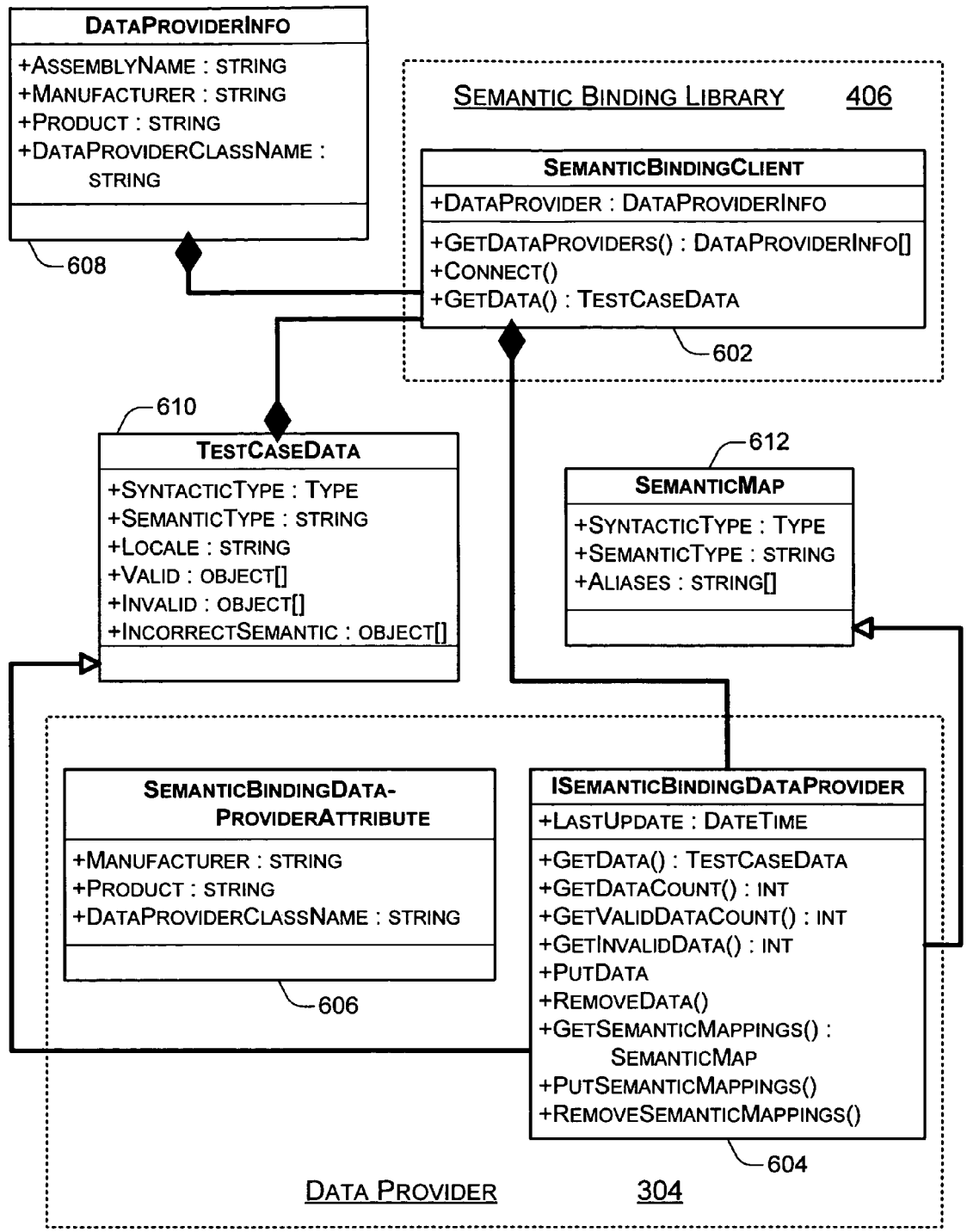
FIG. 6 is an example of a class and object interaction for semantic binding technology in the exemplary testing environment implementation.

FIGS. 4-6 illustrate different aspects of various examples for syntactic to semantic binding in exemplary testing environment implementations. Any of the three above-described testing usage scenarios may be effectuated by changing the data values acquired from the data provider. Additionally, examples of a target runtime environment, as well as data storage/data provider options, are revealed by the descriptions of FIGS. 4-6 below.

FIG. 4 is an example of a functional design architecture 400 for semantic binding technology in an exemplary testing environment implementation. A client application 402 serves as a test engine. Client application 402 is a client with respect to requesting semantically bound data from data providers 304. Client application 402 is charged with testing target library 404. Target library 404 is an example of software 110 (of FIG. 1), and testing is an example of an automated operation thereon.

To function automatically, client application 402 is capable of determining testing parameters from target library 404, requesting relevant data from data providers 304, receiving the relevant data, and applying the relevant data to target library 404. The relevancy of the data is attained using semantic binding technology.

Functional design architecture 400 also includes a semantic binding library 406, a local data provider 304(L), a local data store 408(L), a remote data provider 304(R), a network 410, and a remote data store 408(R). As indicated by the arrows, local data provider 304(L) accesses local data store 408(L) to retrieve semantically-bound data. Remote data provider 304(R) accesses remote data store 408(R) via one or more networks 410 to retrieve semantically-bound data.

In a described operational implementation, client application 402 calls into semantic binding library 406 to request one or more collections of data objects, such as synmantic data objects 108. The client may specify the desired data provider 304. Client application 402 loads target library 404 and uses the returned collection(s) to drive testing. Results of the testing are reported, and possibly analyzed, by client application 402.

Target library 404 implements an API that the user (e.g., a developer or creator of target library 404) wishes to test. Target library 404 is realizable as any of many different types of software 110. Target library 404 is callable by another code module in order to be tested. Examples include, but are not limited to, an executable exporting one or more functions, an XML web service reached via the internet, and so forth.

Semantic binding library 406 provides the API called by client application 402 and handles the loading of the desired data provider 304. Additionally, semantic binding library 406 defines the interface to be implemented by data providers 304 and the object model contract for data transfer.

Data providers 304 are responsible for implementing the interface defined by semantic binding library 406. Data retrievals and updates are performed by the data providers 304 themselves. If a data store 408 is located on a remote resource (e.g., remote data store 408(R)), it is the responsibility of remote data provider 304(R) to perform the required network access. Additionally, it is the responsibility of data providers 304 to translate a native format of data stores 408 into the object model expected by semantic binding library 406.

Data stores 408 contain the information used to bind semantic meaning 104 to data objects 106 to generate synmantic data objects 108. The format of data stores 408 can be implementation specific. As noted above, it is left to data providers 304 that consume data stores 408 to translate the native format thereof to the object model contract expected by semantic binding library 406.

Client application test engine 402 may be implemented as any of many possible test engine types. Three example test engine types are: (1) a general purpose/universal test engine, (2) a custom targeted test engine, and (3) a stress test engine. Descriptions of three such semantic binding automation engine examples follow.

1. A General Purpose/Universal Test Engine

It is typically written by development tool vendors and used by developers of new class libraries or applications. A general purpose test engine usually requires little or no user interaction.

a. Relatively simple, unit test engine

This test engine calls each method in isolation. It is typically used very early in the development of a new class library to verify basic functionality.

Actions include:
i. Load the library to be tested
ii. Identify the methods exported by the library
iii. Iterate through the methods and:
1. determine the types and names of the arguments of each method
2. request synmantic data objects from the semantic binding library
3. call the method with the returned data set(s) (which may involve multiple loop iterations)
4. Report results.
b. Scriptable test engine
The scriptable engine allows the user to customize the running of the test engine by specifying (e.g., limiting) the classes and methods to be tested.
Actions include:
i. Load the library to be tested
ii. Load the provided script file
iii. Read the script to determine the methods to be tested
iv. Locate the methods to be tested
v. Iterate through the methods and:
1. determine the types and names of the arguments of each method
2. request synmantic data objects from the semantic binding library
3. call the method with the returned data set(s) (which may involve multiple loop iterations)
4. report results.
2. A Custom Targeted Test Engine
It is typically written and used by an experienced tester. Custom test engines may target specific scenarios involving multiple method calls in which the results of one call feed the next. The final result of the scenario may be reported once all steps are completed.
Aspects include:
a. User develops test algorithm
b. User's algorithm makes one or more requests to the semantic binding library
i. the user knows the semantic of each argument and specifies them explicitly in each request
ii. no automation engine examination of the test methods is required or need be performed
c. Scenario is executed
i. use the returned synmantic data (which may involve multiple loop iterations)
ii. report results.
3. A Stress Test Engine
Stress testing engines can be based on the general purpose test engine, the custom test engine, or a combination of both engines.
a. Stress test engine based on general purpose
The general purpose stress test engine is typically provided by the development tool vendor and may either be of the simple or scriptable variety.
i. Simple
The simple, general purpose stress test engine typically loops through a target library and calls each method in isolation a very large number (e.g., thousands, millions, etc.) of times. Often, the simple stress engine can be multi-threaded and call more than one method simultaneously. Another variation may call the same method on multiple threads to look for thread-safety bugs.
ii. Scripted
The scripted, general purpose stress test engine reads a script file that specifies the target library methods to call. Like the simple stress test engine, these methods are typically called a very large number of times and may be multi-threaded, too.
b. Custom
Custom stress test engines are most frequently developed in-house by experienced test developers. Typically, these test engines are multi-threaded and exercise extreme scenarios to attempt to cause failures in the code being tested.

FIG. 5 is an example of a general flow of data 500 for semantic binding technology in the exemplary testing environment implementation. Flow of data 500 includes a client application 402, a semantic binding library 406, a semantic binding data provider 304, and a semantic data store 408. As illustrated, flow of data 500 is for a test case 502 of client application 402. Also, semantic binding library 406 includes a client API 504.

For client application 402 to test a target library 404 (of FIG. 4), a test data collection (TDC) 506 is acquired from semantic binding data provider 304. TDC 506 may be a single synmantic data object 108 (with one or multiple values 206 (of FIG. 2)) or multiple synmantic data objects 108 (each with one or multiple values 206).

In a described operational implementation, test case 502 of client application 402 requests a data collection (DC) (508) from client API 504 of semantic binding library 406. Client API 504 opens the desired data provider 304 (510). Client API 504 forwards the DC request (512) to data provider 304.

Semantic binding data provider 304 loads data store 408 (514). Data provider 304 queries data store 408 for the requested DC (516). Data provider 304 retrieves TDC 506 from semantic data store 408. Data provider 304 then returns the requested DC (518) to client API 504 of semantic binding library 406.

Semantic binding library 406 via client API 504 returns the DC (522) to test case 502 of client application 402. Hence, test case 502 receives the DC (524). Test case 502 runs the code (526) of target library 404. In other words, client application 402 iterates through the values received in TDC 506. Test case 502 of client application 402 reports the test results (528).

FIG. 6 is an example of a class and object interaction 600 for semantic binding technology in the exemplary testing environment implementation. Class and object interaction 600 includes two (2) classes 602 and 604 and four (4) objects 606, 608, 610, and 612. The two classes are SemanticBindingClient 602 and ISemanticBindingDataProvider 604. The four objects are SemanticBindingDataProviderAttribute 606, DataProviderInfo 608, TestCaseData 610, and SemanticMap 612.

When a client application 402 employs the semantic binding technology, it instantiates an instance of SemanticBindingClient object 602. SemanticBindingClient object 602 instantiates the data provider's 304 implementation of the ISemanticBindingDataProvider interface 604. To determine the appropriate class, client application 402 accesses the data provider's 304 SemanticBindingDataProviderAttribute 606 and stores that information in an instance of the DataProviderInfo class 608.

Once loaded, the SemanticBindingClient 602 forwards data requests from client application 402 to data provider 304. The requested data collection is then returned to client application 402 through SemanticBindingClient 602. It should be noted that in FIG. 6 the ISemanticBindingDataProvider 604 is shown as being defined within data provider 604. While the actual definition is in semantic binding library 406, the actual implementation is done in data provider 304. Because the actual code lives in data provider 304, the interface is illustrated there.

With regard to the client API, it provides the following features. First, it returns data using a well defined format. This format includes: the data value(s), the syntactic type, the semantic meaning, the locale, and the validity flag. Second, it provides data sets which are semantically meaningful. These data sets include: valid data; valid, yet incorrect (e.g., malformed) data; and semantically invalid data (e.g., a city name where a zip code is requested). Third, it enables randomization of the returned data in which the seed value that generated the current data set is returned to the caller, wherein providing the seed value reproduces the same data set (when requested from the same provider). Fourth, it provides an ability to specify the target data provider, including local and remote data stores.

With reference to SemanticBindingClient 602, DataProvider is a read-only property providing information about the user's requested data provider. The value of the DataProvider property is set when the user calls the Connect method. The GetDataProviders method returns an array of DataProviderInfo objects. Calling applications select a provider from the array and pass that value to the Connect method. The Connect method instructs the client to instantiate an instance of the selected data provider. The data provider, in turn, opens a connection to its data store. Once the Connect method returns, the caller can request semantically meaningful data. If the Connect method fails, an appropriate exception is thrown.

The GetData method is called by consumers of the SemanticBindingClient 602 to request semantically meaningful data from the selected data provider. On return, callers check the values of the numValid, numInvalid, and numIncorrectSemantic to discover the actual number of data objects returned in the TestCaseData object 610. These values may be smaller than originally specified if there is not enough data to satisfy the request.

With regard to the data provider interface, it is defined by semantic binding library 406 and is implemented by each of data providers 304. The interface specifies each of the following features. First, it has a consistent format for describing data values. This format includes: at least one data value, a syntactic type, a semantic meaning, a locale, and a validity flag. Second, it has data store product information. This information includes: manufacturer name, product name, data provider class name, and last update date and time. Third and fourth, it has methods to retrieve data from the store and methods to update the data from the store. These update methods include: add, modify, and remove. Optionally, the data store interface may provide mappings between two or more semantic types (e.g., mapping "province" to "state" to account for aliases).

With reference to ISemanticBindingDataProvider 604, LastUpdate is a read-only property (set by the data store update methods) providing the date and time of the most recent update to the contents of the data store. The GetData method queries the data store using the syntactic and semantic types. The target locale is used to filter the data into valid and invalid objects (e.g., "Washington" is a valid state in the United States and invalid in Canada). The caller specifies the requested number of valid, invalid, and semantically incorrect (e.g., returning the name of a city when a zip code is requested) objects. If there are less than the requested numbers of objects, the actual number returned is reported back to the caller through the same, bi-directional arguments. If a random seed is specified, the data collection returned is the same each time the same seed is used. If no seed is provided, the GetData method generates one and returns it through the same argument. The GetData method returns a TestCaseData object 610, which contains the data objects collections.

The GetDataCount method returns the total number of data objects, within the specific locale, for a given semantic. The GetValidDataCount method returns the total number of valid data objects, within the specific locale, for a given semantic. The GetInvalidDataCount method returns the total number of malformed or otherwise invalid data objects, within the specific locale, for a given semantic.

The PutData method writes the array of data objects to the data store. The RemoveData method removes the array of data objects from the data store. The GetSemanticMappings method returns an array containing the semantic meanings (including aliases) for the specified data type. The PutSemanticMappings method writes the array of semantic mappings to the data store. The RemoveSemanticMappings method deletes the array of semantic mappings from the data store.

With regard to data types, SemanticBindingDataProviderAttribute 606, DataProviderInfo 608, TestCaseData 610, and SemanticMap 612 are described as follows. With reference to SemanticBindingDataProviderAttribute 606, the Manufacturer property contains the name of the company which markets the data provider. The Product property contains the name of the data provider product. The DataProviderClassName property contains the name of the class that provides the data provider's implementation of the ISemanticBindingDataProvider interface.

With reference to DataProviderInfo 608, the AssembyName field contains the strong name (e.g., name, version, locale, etc.) describing the assembly containing the data provider code. The Manufacturer field directly maps to the SemanticBindingDataProviderAttribute.Manufacturer property. The Product field directly maps to the SemanticBindingDataProviderAttribute.Product property. The DataProviderClassName field directly maps to the SemanticBindingDataProvider-Attribute.DataProviderClassName property.

With reference to TestCaseData 610, it should be noted that in the implementation depicted in FIG. 6, the SynmanticData object (108) is replaced by TestCaseData 610. This example substitution is instituted to reduce the size of the data transfer (e.g., the SyntacticType, SemanticType, and Locale fields may be sent once instead of multiple times) when more than one object is requested by client application 402. On slow network connections, this increases performance (by reducing the size of the transferred data) at the expense of keeping bound objects self-contained.

The SyntacticType field contains a Type object describing the runtime type of the data object. The SemanticType field contains the semantically meaningful type name (e.g., "country") of the data object. The Locale property contains the spoken-language and geographic location (e.g., "de-CH") in which the semantic type is meaningful for the data object. The Valid field contains the array of data objects which are semantically meaningful and valid, within the specified locale (e.g., "California" is a valid "state" in locale "en-US"). If there are no objects to return, implementations may return either a 0 element array or NULL.

The Invalid field contains the array of data objects which are semantically meaningful, though invalid, within the specified locale (e.g., "Bavaria" is an invalid "state" in locale "en-US"). Data within this array are considered to be "malformed". If there are no objects to return, implementations may return either a 0 element array or NULL. The IncorrectSemantic field contains the array of data objects which are not semantically meaningful within the specified locale. If there are no objects to return, implementations may return either a 0 element array or NULL.

With reference to SemanticMap 612, the SemanticMap object 612 provides support for providing aliases for semantic types. Although this is an optional feature of semantic binding technology as described, it can reduce redundancy in the data store. The SyntacticType field contains the runtime type of the data object. The SemanticType field contains semantic meaning (e.g., "city") of the data object. The Aliases field contains an array of alternate semantic meanings (e.g., "town", "village", etc. are aliases for "city") for the data object.

With regard to a data store format (not explicitly illustrated in FIG. 6), the format of the data provider may be tailored as desired by individual implementers. (The example provided below uses XML.) The data store (e.g., a data store 408) may include the following features. First is a data value, which is the value of the data object. Second is a syntactic type, which is the runtime data type. Third is a semantic type, which is the real world meaning of the data (e.g., city name). Fourth is a locale, which is the locale in which the semantic meaning is understood (e.g., en-US for the United States). Fifth is validity, which is a flag specifying the validity of the data within the specified locale.

An example implementation of a semantic binding data store is provided below in an example XML format.

```
<SemanticDataStore>
    <productInfo manufacturer="Microsoft"
                 product="Sample Semantic Data Store"
                 updated="Month/Day/Year" />
    <aliases>
        <semantic name="zipcode" type="System.String,mscorlib">
            <alias name="zip" />
            <alias name="zipCode" />
            <alias name="postalCode" />
        </semantic>
        <semantic name="state" type="System.String,mscorlib">
            <alias name="province" />
        </semantic>
    </aliases>
    <semantics>
        <semantic name="zipcode" type="System.String,mscorlib">
            <locale name="en-US">
                <valid>
                    <value>98011</value>
                    <value>02134</value>
                    <value>98052-6399</value>
                </valid>
                <invalid>
                    <value>2134</value>
                    <value>o2134</value>
                    <value>98-21</value>
                    <value>98052-63</value>
                </invalid>
            </locale>
        </semantic>
        <semantic name="state" type="System.String,mscorlib">
            <locale name="en-US">
                <valid>
                    <value>California</value>
                    <value>Michigan</value>
                    <value>Washington</value>
                </valid>
                <invalid>
                    <value>Bavaria</value>
                </invalid>
            </locale>
            <locale name="en-CA">
                <valid>
                    <value>British Columbia</value>
                    <value>Nova Scotia</value>
```

-continued

```
                </valid>
            </locale>
        </semantic>
    </semantics>
</SemanticBindingStore>
```

The nodes used in the above XML-formatted example are described below. First, the productInfo node contains bookkeeping (e.g., Manufacturer, Product, etc.) data. The manufacturer and product attributes map directly into the Manufacturer and Product fields in the DataProviderInfo 608 and SemanticBindingDataProviderAttribute 606 objects. The update field stores the date and time the contents of the store were modified.

Second, the semantic node is the "key" to the data store. It defines the binding between a runtime type and semantic meaning. The semantic meaning is described in the name attribute. In this example implementation, the value of the name attribute is the argument name taken from code. Consequently, it follows the syntactic rules of the target library's programming language (e.g., no spaces, must begin with an alphabetic character or an underscore, etc.). The value of the type attribute contains the name of the runtime type. The values (both valid and invalid) apply to specific locales; however, the semantic type names do not. Semantic nodes can appear beneath the semantics and aliases nodes.

Third, the semantics node serves as a master container for the registered semantically bound data. Fourth, the alias node provides the optional mapping of one semantic type to another. Although the alias feature is optional, data stores that implement the alias feature can reduce redundancy and thus the overall size of the data. The alternate semantic names are registered in the name attribute of the alias node. Aliases are locale agnostic. Alias nodes appear beneath semantic nodes within the aliases block of the data store.

Fifth, the aliases node serves as a master container for the registered alternate semantic names. Sixth, the locale node provides a container to group data which is valid or invalid based on spoken language and/or geographic location (e.g., country). The name attribute contains a string indicating both the language and the location in the following format: ll-CC where "ll" is an abbreviation for the spoken language and "CC" is an abbreviation for the country (e.g., "en-US" denotes English—United States). To specify a neutral (e.g., global) locale, the empty string is used.

Seventh, the valid node contains zero or more value nodes, each of which contains data which is both semantically meaningful and valid for the specified locale. Eighth, the invalid node contains zero or more value nodes, each of which contains data which is semantically meaningful but not valid for the specified locale. Ninth, the value node contains the serialized version of the data object. The serialization of the data object is dependant on the format (e.g., XML, comma separated, etc) of the data store.

The devices, actions, formats, aspects, features, procedures, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks and/or other illustrated parts can be modified, combined, rearranged, augmented, omitted, etc. in any manner to implement one or more systems, methods, devices, procedures, media, apparatuses, APIs, arrangements, etc. for syntactic to semantic binding. Furthermore, although the description herein includes references to specific implementations (including the general device of FIG. 7 below), the illustrated and/or described implementations can be implemented in any suitable hardware, software, firmware, or combination thereof and using any appropriate object container(s), runtime environment(s), format representation(s), communication protocol(s), data structure organization(s), and so forth.

EXAMPLE OPERATING ENVIRONMENT FOR COMPUTER OR OTHER DEVICE

Figure 7:
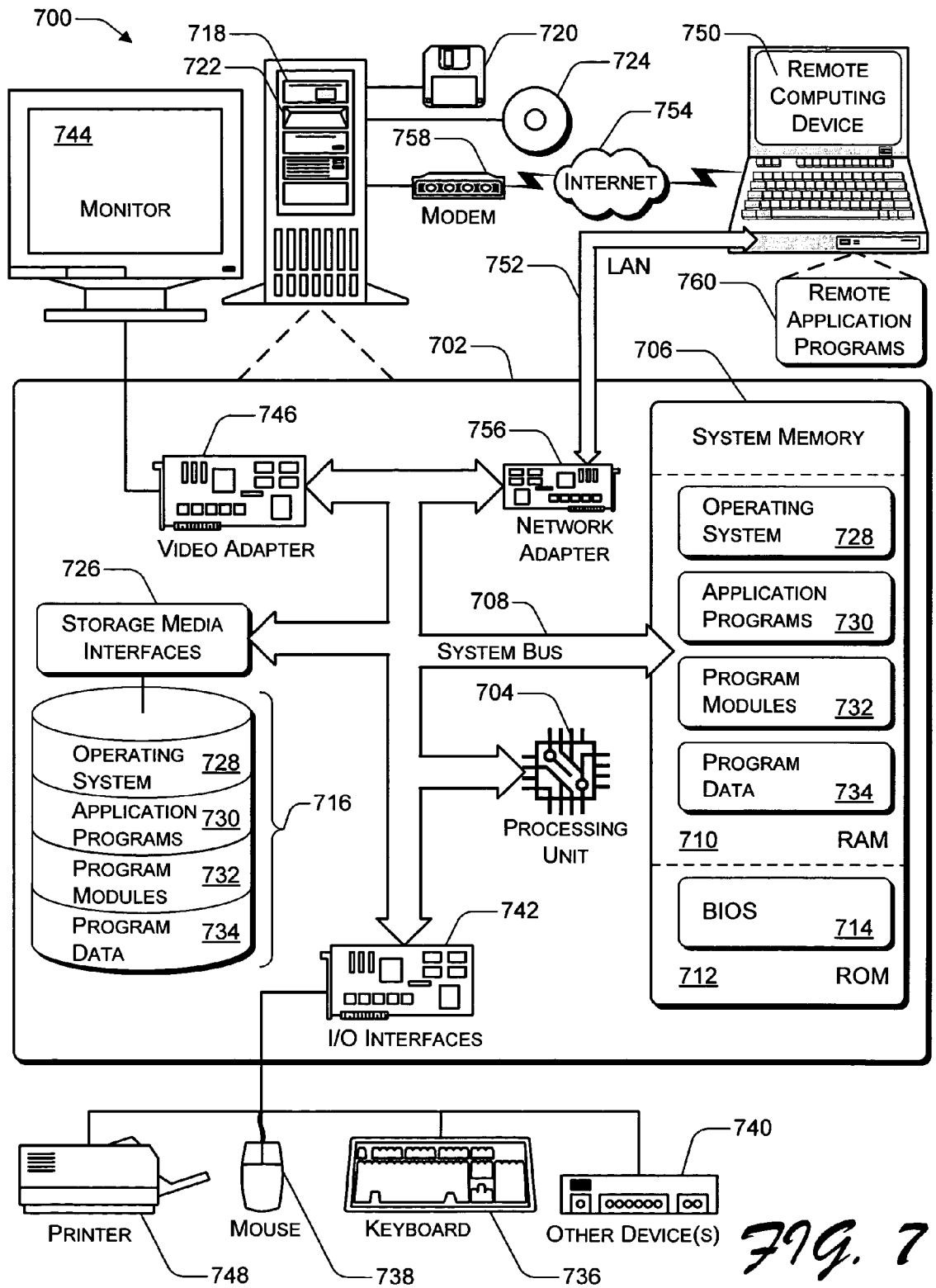
FIG. 7 illustrates an example of a computing (or general device) operating environment that is capable of (wholly or partially) implementing at least one aspect of syntactic to semantic binding as described herein.

FIG. 7 illustrates an example computing (or general device) operating environment 700 that is capable of (fully or partially) implementing at least one system, device, apparatus, component, arrangement, protocol, approach, method, procedure, media, API, some combination thereof, etc. for syntactic to semantic binding as described herein. Operating environment 700 may be utilized in the computer and network architectures described below.

Operating environment 700, as well as device(s) thereof and alternatives thereto, may realize objects in accordance with synmantic data objects 108 and/or implement APIs in accordance with the semantic binding technology as described herein. For example, devices may create (e.g., instantiate), utilize (e.g., in database accessing or software testing), etc. synmantic data objects 108. Furthermore, such devices may store a description of the format for synmantic data objects 108. Moreover, such devices may acquire and/or provide a semantically bound data set with regard to a target library as is described above. Devices may also implement one or more aspects of syntactic to semantic binding in other alternative manners.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, syntactic to semantic binding may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for syntactic to semantic binding may be described in the general context of processor-executable instructions. Generally, processor-executable instructions include routines, programs, protocols, objects, interfaces, components, data structures, etc. that perform and/or enable particular tasks and/or implement particular abstract data types. Syntactic to semantic binding, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media.

System memory 706 includes processor-accessible storage media in the form of volatile memory, such as random access memory (RAM) 740, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although example computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hardwired IC chips. In other words, any processor-accessible media may be utilized to realize the storage media of the example operating environment 700.

Any number of program modules (or other units or sets of instructions/code) may be stored on hard disk 716, magnetic disk 720, optical disk 724, ROM 712, and/or RAM 740, including by way of general example, an operating system 728, one or more application programs 730, other program modules 732, and program data 734. These program modules may define, create, use, etc. synmantic data objects 108 as described herein for implementing syntactic to semantic bindings.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are examples and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, APIs, arrangements, and other implementations have been described in language specific to structural, logical, algorithmic, relational, and functional features and/or diagrams, it is to be understood that the invention defined in the appended claims is not necessarily limited to the specific features or diagrams described. Rather, the specific features and diagrams are disclosed as example forms of implementing the claimed invention.

What is claimed is:

1. One or more processor-accessible storage media comprising processor-executable instructions that, when executed, direct a device to:
   instantiate, for use, one or more data objects comprising:
   at least one data value;
   a syntactic type of the at least one data value; and
   a semantic meaning of the at least one data value;
   bind the syntactic type of the at least one data value to the semantic meaning of the at least one data value; and
   transform the one or more data objects into one or more synmantic data objects.

2. The one or more processor-accessible storage media as recited in claim 1, wherein the semantic meaning comprises a string that represents the real-world description of the at least one data value.

3. The one or more processor-accessible storage media as recited in claim 1, wherein the syntactic type comprises a string type or an integer type.

4. The one or more processor-accessible storage media as recited in claim 1, wherein the one or more data objects further comprises:
a locale indicator that provides a regional and/or a cultural significance to the at least one data value with regard to the semantic meaning.

5. The one or more processor-accessible storage media as recited in claim 4, wherein the one or more data objects further comprises:
a validity flag that indicates if the at least one data value is valid or invalid with regard to the indicated locale.

6. The one or more processor-accessible storage media as recited in claim 5, wherein the validity flag, when set to invalid, indicates that the at least one data value is incorrectly formatted or not semantically meaningful for the indicated locale.

7. The one or more processor-accessible storage media as recited in claim 1, wherein the processor-executable instructions, when executed, further direct the device to perform an operation on a software module using the at least one data value of the one or more data objects.

8. The one or more processor-accessible storage media as recited in claim 7, wherein the processor-executable instructions, when executed, further direct the device (i) to extract from the software module the syntactic type of an input thereof and (ii) to ascertain the semantic meaning associated with the input from an argument of the input.

9. The one or more processor-accessible storage media as recited in claim 8, wherein the processor-executable instructions, when executed, further direct the device to request the at least one data value of the one or more data objects from a data provider, the request specifying the extracted syntactic type and the ascertained semantic meaning.

10. A computer-implemented method, comprising:
sending a request for a data set to a data provider, the request specifying a syntactic type and a semantic meaning for data values of the requested data set;
receiving the requested data set from the data provider;
binding the syntactic type and the semantic meaning of the data values;
transforming the data values into one or more synmantic data objects; and
applying the one or more synmantic data objects to software module in order to test and evaluate the software module with relevant data that is both syntactically correct and semantically meaningful.

11. The method as recited in claim 10, further comprising:
extracting the syntactic type for the data values from an application programming interface (API) of the software module.

12. The method as recited in claim 10, further comprising:
ascertaining the semantic meaning for the data values from an application programming interface (API) of the software module.

13. The method as recited in claim 10, further comprising:
identifying a pertinent locale;
wherein the request further specifies the pertinent locale.

14. The method as recited in claim 10, further comprising:
instantiating an object that formulates the request and effectuates the sending and receiving.

15. The method as recited in claim 10, wherein the performing comprises:
applying the data values of the requested data set to the software module to test the software module.

16. The method as recited in claim 10, further comprising:
acquiring from the data provider information describing data to which the data provider has access.

17. The method as recited in claim 10, wherein the requested data set comprises a first collection of valid data, a second collection of invalid data, and a third collection of semantically-incorrect data; and
wherein the performing comprises:
applying the first collection, the second collection, and the third collection to the software module in the operation.

18. A device, comprising:
at least one processor;
one or more media including processor-executable instructions that, when executed by the at least one processor, direct the device to establish an application programming interface (API) for requested data, the API comprising:
a syntactic type of the requested data; and
a semantic meaning of the requested data;
wherein the processor-executable instructions further direct the device to provide a data set having the syntactic type and the semantic meaning of the requested data.

19. The device as recited in claim 18, wherein the processor-executable instructions further direct the device to retrieve the data set from a data store, the data store tagging data stored therein with syntactic type and semantic meaning.

20. The device as recited in claim 18, wherein the API further comprises a pertinent locale; and wherein the processor-executable instructions further direct the device to provide the data set such that data values thereof are relevant to the semantic meaning in terms of the pertinent locale.

21. The device as recited in claim 18, wherein the API further enables a requesting client to specify whether valid, invalid, and/or semantically-incorrect data values are being requested.

22. The device as recited in claim 18, wherein the processor-executable instructions further direct the device to consider aliases for the semantic meaning that is accepted via the API.

23. The device as recited in claim 18, wherein the processor-executable instructions further direct the device to provide the data set in a valid data value collection, an invalid data value collection, and a semantically-incorrect data value collection.

24. One or more processor-accessible storage media including processor-executable instructions that comprise a client testing application, the client testing application is to extract a syntactic type and to ascertain an associated semantic meaning of an argument from a target software module,
wherein the client testing application is to direct a device to perform actions comprising:
requesting a data set from a data provider, a request thereof specifying the syntactic type and the associated semantic meaning of the argument; and
applying the data set to the target software module.

25. The one or more processor-accessible storage media as recited in claim 24, wherein the request also specifies a pertinent locale.

26. The one or more processor-accessible storage media as recited in claim 24, wherein the request also specifies the data provider.

27. The one or more processor-accessible storage media as recited in claim 24, wherein the client testing application is to direct the device to perform a further action comprising:
loading a script file that identifies at least one method of the target software module to be tested,
wherein the applying comprises applying the data set to the at least one identified method of the target software module.

28. The one or more processor-accessible storage media as recited in claim 24, wherein the client testing application is to direct the device to perform a further action comprising:
    reporting test results precipitated from the action of applying.

29. The one or more processor-accessible storage media as recited in claim 24, wherein the applying comprises at least one of:
    applying valid data values to the target software module;
    applying invalid data values to the target software module; or
    applying semantically-incorrect data values to the target software module.

30. A computer-implemented arrangement for syntactic to semantic binding, the arrangement comprising:
    determination means for determining syntactic types and names of arguments of multiple methods to be tested;
    request means for requesting synmantic data objects from a semantic binding library based on the determined syntactic types and names of the arguments; and
    application means for calling each method with at least one returned synmantic data object.

31. The computer-implemented arrangement as recited in claim 30, wherein the determination means comprises:
    extraction means for extracting the syntactic types of the arguments; and
    ascertainment means for ascertaining a semantic meaning of the arguments from the names thereof.

32. The computer-implemented arrangement as recited in claim 30, wherein the request means comprises:
    library means for binding a semantic meaning to the syntactic type of data in the requested synmantic data objects.

33. The computer-implemented arrangement as recited in claim 30, further comprising:
    load means for loading a script file that identifies the multiple methods to be tested; and
    read means for reading the script file to identify the multiple methods to be tested.

34. The computer-implemented arrangement as recited in claim 30, further comprising:
    report means for reporting results derived from the calling by the application means.

35. The computer-implemented arrangement as recited in claim 30, wherein the computer-implemented arrangement comprises at least one of (i) one or more processor-accessible storage media or (ii) at least one device.

36. The computer-implemented arrangement as recited in claim 30, wherein the at least one returned synmantic data object includes a locale field and a validity field.

* * * * *